United States Patent
Zhou et al.

(10) Patent No.: US 8,196,876 B2
(45) Date of Patent: Jun. 12, 2012

(54) SUPPORT MECHANISM WITH ADJUSTMENT SUBASSEMBLY

(75) Inventors: Fan Zhou, Shenzhen (CN); Ben-Gui Long, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 128 days.

(21) Appl. No.: 12/549,507

(22) Filed: Aug. 28, 2009

(65) Prior Publication Data
US 2010/0252708 A1    Oct. 7, 2010

(30) Foreign Application Priority Data
Apr. 1, 2009    (CN) .......................... 2009 1 0301282

(51) Int. Cl.
*A47F 5/02*    (2006.01)
(52) U.S. Cl. .................. 248/131; 248/125.7; 248/299.1; 248/349.1
(58) Field of Classification Search .......... 248/917–924, 248/131, 125.7, 299.1, 349.1; 361/679.22, 361/679.21, 679.26, 679.02
See application file for complete search history.

(56) References Cited

U.S. PATENT DOCUMENTS

| | | | | |
|---|---|---|---|---|
| 2,720,372 A | * | 10/1955 | Gowan | 248/186.2 |
| 4,520,987 A | * | 6/1985 | Eguchi et al. | 248/635 |
| 5,622,343 A | * | 4/1997 | Morton | 248/131 |
| 5,909,864 A | * | 6/1999 | Wang | 248/289.11 |
| 6,801,426 B2 | * | 10/2004 | Ichimura | 361/679.06 |
| 7,440,038 B2 | * | 10/2008 | Kato | 348/794 |
| 7,588,220 B2 | * | 9/2009 | Sim et al. | 248/188.8 |
| 7,637,463 B2 | * | 12/2009 | Yen et al. | 248/157 |
| 7,748,680 B2 | * | 7/2010 | Choi | 248/371 |
| 7,766,288 B2 | * | 8/2010 | Kim et al. | 248/176.1 |
| 7,810,776 B2 | * | 10/2010 | Long et al. | 248/346.03 |
| 7,823,854 B2 | * | 11/2010 | Tsai | 248/429 |
| 7,839,626 B2 | * | 11/2010 | Chen et al. | 361/679.07 |
| 7,874,537 B2 | * | 1/2011 | Kameoka et al. | 248/349.1 |
| 2004/0084578 A1 | * | 5/2004 | Cho et al. | 248/125.1 |
| 2005/0194509 A1 | * | 9/2005 | Tsai et al. | 248/349.1 |
| 2008/0093528 A1 | * | 4/2008 | Tsai et al. | 248/917 |
| 2008/0200069 A1 | * | 8/2008 | Hankey et al. | 439/607 |
| 2009/0045311 A1 | * | 2/2009 | Seyedin | 248/349.1 |
| 2010/0103596 A1 | * | 4/2010 | Zhou | 361/679.01 |

\* cited by examiner

*Primary Examiner* — Nkeisha Smith
(74) *Attorney, Agent, or Firm* — Altis Law Group, Inc.

(57) ABSTRACT

A support mechanism includes a bracket and a rotary unit including a base and at least one adjustment subassembly. The adjustment subassembly includes an elastic member and a ball. The elastic member resists the ball to contact the bracket. The bracket is rotatable relative to the base.

13 Claims, 6 Drawing Sheets

SUPPORT MECHANISM WITH ADJUSTMENT SUBASSEMBLY

BACKGROUND

1. Technical Field

The present disclosure generally relates to support mechanisms and, particularly, to a support mechanism for supporting display devices.

2. Description of Related Art

A frequently used display can rotate along a horizontal axis to allow viewing from different angles. However, when a viewing angle is outside the range of rotation about the horizontal axis, the entire display device must be manually relocated, an inconvenient requirement.

Accordingly, display panels rotatable along multiple axes are provided to accommodate a wider variety of viewing angles. However, a base support of the display device must remain fixed to provide stability.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
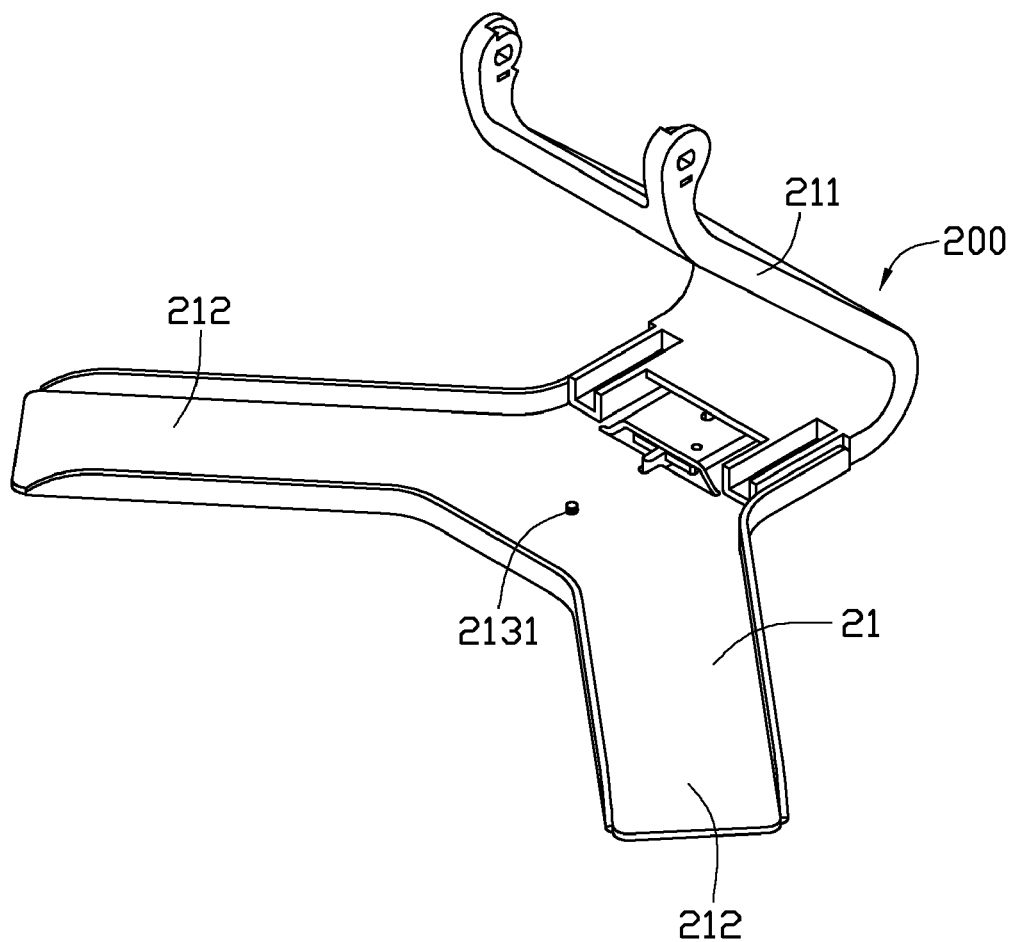
FIG. 1 is an assembled, isometric view of an embodiment of a support mechanism, the support mechanism including a bracket, a connecting member, a cushion, and a rotary unit including a plurality of adjustment subassemblies.
Figure 2:
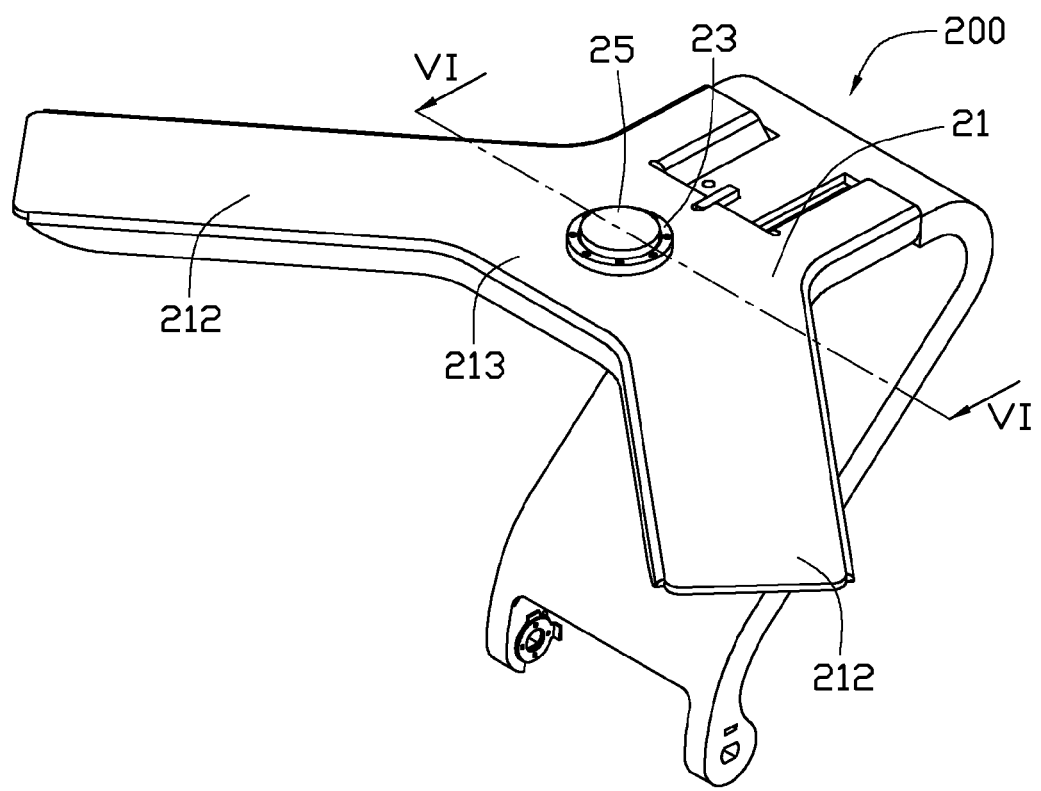
FIG. 2 is an assembled, isometric view of the support mechanism of FIG. 1, viewed from another aspect.
Figure 3:
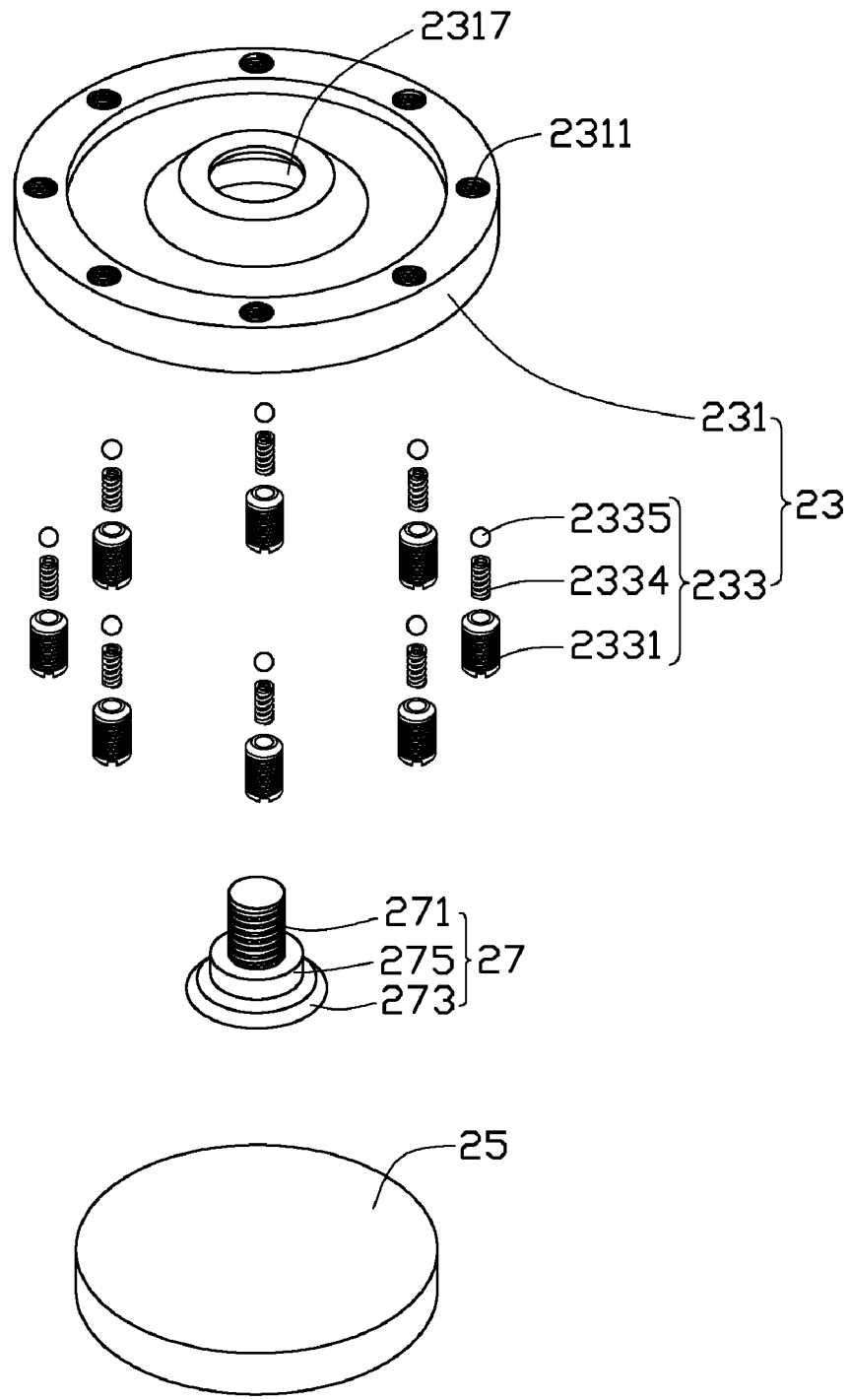
FIG. 3 is a partial, exploded, isometric view of the support mechanism of FIG. 1.

Referring to FIG. 1 and FIG. 2, an embodiment of a support mechanism 200 includes a bracket 21, a rotary unit 23, and a connecting member 27 (shown in FIG. 3). The support mechanism 200 may further include a cushion 25. The support mechanism 200 is used to support an object such as a display device (not shown).

The bracket 21 includes a connecting portion 211 and two supporting legs 212 connected to an end of the connecting portion 211. The two supporting legs 212 extend away from each other, thus forming a V-shaped structure. The bracket 21 includes an underside 213 and defines a connecting hole 2131. The rotary unit 23 engages in the connecting hole 2131 to connect with the bracket 21. The cushion 25 is connected to the rotary unit 23. The cushion 25 and the supporting legs 212 contact a supporting surface, such as a desktop surface, to stably support the object.

Figure 4:
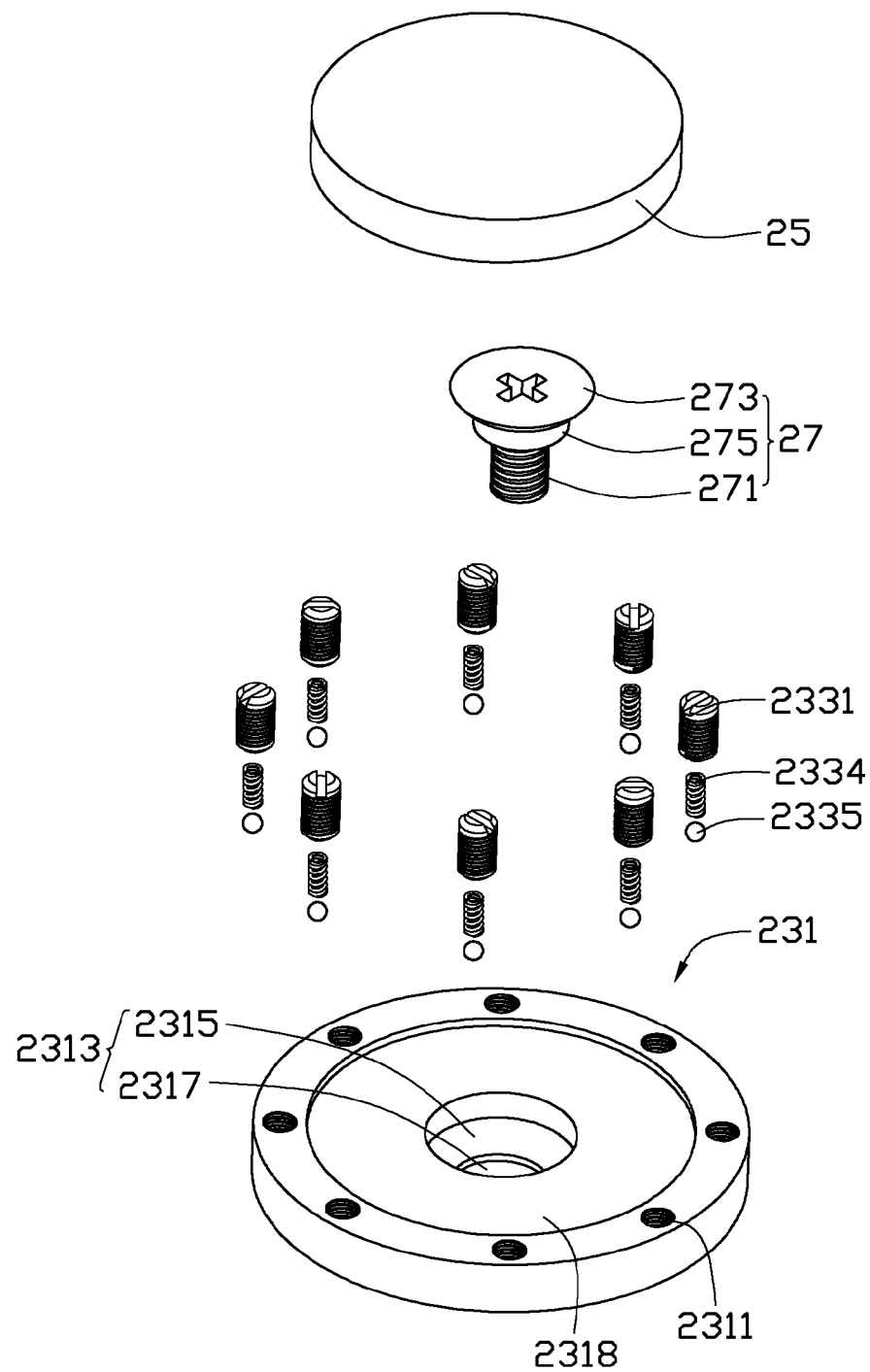
FIG. 4 is a partial, exploded, isometric view of the support mechanism of FIG. 1, viewed from another aspect.
Figure 5:
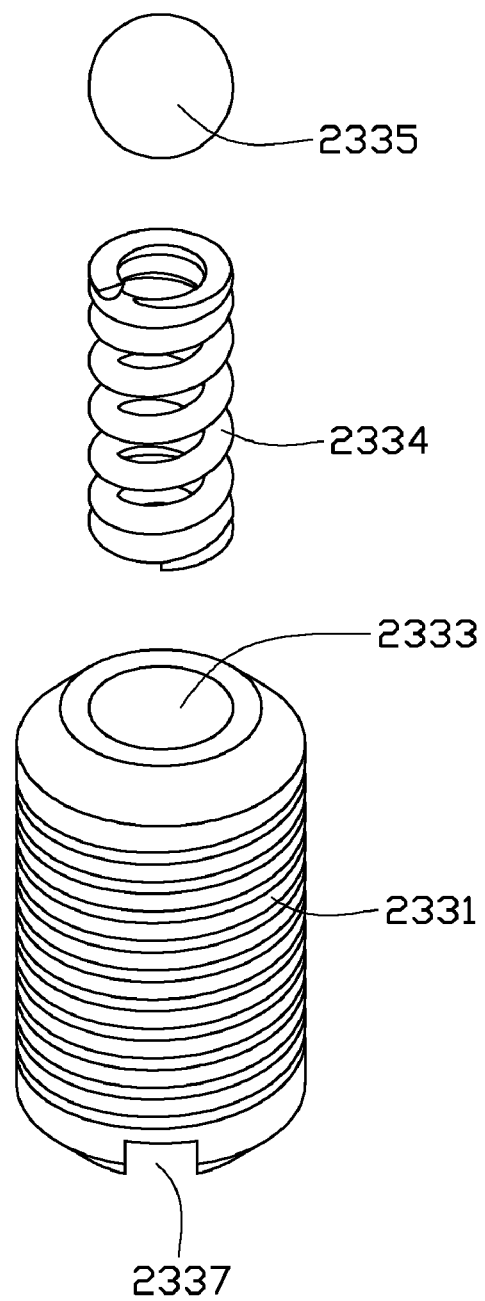
FIG. 5 is an exploded, isometric view of the adjustment subassembly of the support mechanism of FIG. 1.

Referring to FIGS. 3 through 5, the rotary unit 23 includes a base 231 and a plurality of adjustment subassemblies 233. The adjustment subassembly 233 includes a tube 2331, an elastic member 2334, and a spherical ball 2335.

The base 231 defines a plurality of receiving holes 2311 at a periphery thereof and a mounting hole 2313 in the center portion. The receiving holes 2311 are symmetrically defined along a circle. The mounting hole 2313 includes a first hole 2315 and a second hole 2317 having a diameter smaller than that of the first hole 2315. The base 231 further defines a depression 2318.

The tube 2331 has a closed end and a cavity 2333 to receive the elastic member 2334 and the ball 2335. An end portion of the cavity 2333 is smaller than other portions of the cavity 2333 except the end portion. In the illustrated embodiment, the tube 2331 is made of metal, and the elastic member 2334 is a compression spring. A diameter of the elastic member 2334 and the ball 2335 is greater than the end portion of the cavity 2333 and smaller than other portions of the cavity 2333. During assembly, the tube 2331 may be heated to expand so that the elastic member 2334 and the ball 2335 may be received in the cavity 2333 via the end portion thereof. Once the tube 2331 is cooled and returns to its original size, the elastic member 2334 and the ball 2335 are retained in the cavity 2333. Opposite ends of the elastic member 2334 resist the closed end and the ball 2335 respectively. The tube 2331 may be threaded on an outsider portion of the tube 2331 to engage in the receiving hole 2311. The tube 2331 may define a slot 2337 to facilitate assembly of the tube 2331 to the base 231. In alternative embodiments, the tube 2331 may be omitted, and the elastic member 2334 and the ball 2335 may be received directly in the receiving hole 2311. The receiving hole 2311 is also closed at one end and has a reduced end portion similar to the cavity 2333 to retain the ball 2335 and the elastic member 2334.

The connecting member 27 includes a threaded shaft 271, a flange 273, and a step 275 between the threaded shaft 271 and the flange 273. The threaded shaft 271 passes through the mounting hole 2313 of the base 231, and engages in the connecting hole 2131 of the bracket 21 to connect the base 231 to the bracket 21. The balls 2335 resist the underside 213 of the bracket 21. The base 231 is rotatable relative to the bracket 21 around the axis of the connecting member 27. The cushion 25 is fixed on the base 231 and a part of the cushion 25 is received in the depression 2318. In the illustrated embodiment, the cushion 25 is adhered to the base 231. A portion of the cushion 25 protrudes out of the depression 2318 of the base 231.

Figure 6:
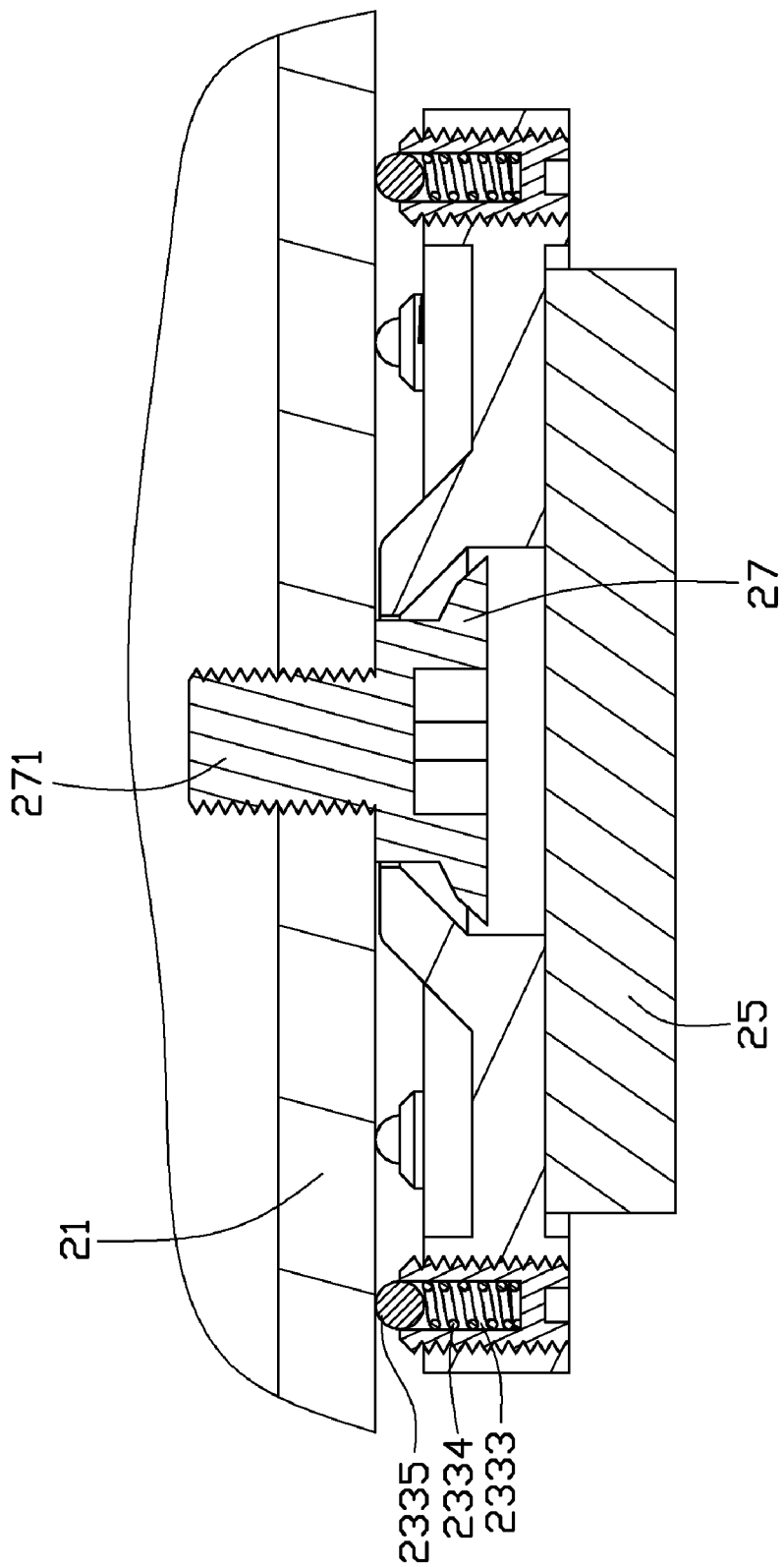
FIG. 6 is a partial cross-section of the support mechanism of FIG. 2, taken along line VI-VI.

Referring to FIG. 6, in use, a display panel (not shown) may be fixed to the connecting portion 211 of the bracket 21, and the support mechanism 200 is supported by a supporting surface, such as a desktop surface, with the underside 213 facing the supporting surface. The elastic members 2334 are compressed and force the balls 2335 to resist the underside 213 of the bracket 21, thus the base 231 elastically supports the bracket 21. If the supporting surface is not flat, the elastic members 2334 deform to stabilize the support mechanism 200.

To rotate the display panel, the bracket 21 is elevated to withdraw the supporting legs 212 from the surface and the display panel rotated. The bracket 21 and the connecting member 27 rotate relative to the base 231 and the balls 2335 rotate relative to the tubes 2331. Relatively little force is needed to rotate the display panel. Since a spot-contact is made between the bracket 21 and the balls 2335, no dust or other small particles between the bracket 21 and the balls 2335 can impede rotation therebetween and generate noise. If the underside 213 is not flat, the elastic members 2334 can deform to different lengths, thus allowing the bracket 21 to rotate stably.

In the illustrated embodiment, there are eight elastic members 2334 and eight balls 2335. In alternative embodiments, any number of elastic members 2334 and balls 2335 may be used. The supporting legs 212 may be omitted, especially if the cushion 25 is relatively large. The bracket 21 may define a ring-shaped groove in the underside 213 to receive part of the balls 2335, such that the bracket 21 may rotate more stably. The balls 2335 may alternatively be any resisting members having shapes other than a spherical shape. However, when the resisting member is not spherical, rotation may be less smooth.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support mechanism, comprising:
a bracket; and
a rotary unit comprising a base and at least one adjustment subassembly, the at least one adjustment subassembly each comprising an elastic member, a ball, and a tube defining a cavity, the elastic member and the ball are received and restricted in the cavity of the tube, the elastic member urges the ball to partially protrude out of the tube;
wherein the base defines a plurality of receiving holes; the at least one adjustment subassembly comprises a number of adjustment assemblies equal to a number of the receiving holes; the base is spaced from the bracket, and a gap is formed between the base and the bracket; the tube of each adjustment subassembly is received in a respective receiving hole, the ball of each adjustment subassembly extends into the gap, and resists the bracket to elastically support the bracket, the bracket is rotatable relative to the base.

2. The support mechanism of claim 1 further comprising a connecting member connecting the base to the bracket.

3. The support mechanism of claim 2, wherein the connecting member comprises a threaded shaft, a flange, and a step between the flange and the threaded shaft; the base defines a mounting hole; the bracket defines a connecting hole; and the threaded shaft runs through the mounting hole of the base and engages the connecting hole of the bracket to connect the base to the bracket.

4. The support mechanism of claim 1, wherein the elastic member is a compression spring to urge the ball to resist the bracket.

5. The support mechanism of claim 1, wherein the receiving holes of the base are threaded, and engaged with threads formed on the tubes.

6. The support mechanism of claim 1, wherein the bracket comprises a connecting portion and two supporting legs connected to an end thereof; and the base and the supporting legs cooperatively support the support mechanism.

7. The support mechanism of claim 1, further comprising an elastic cushion fixed to the base, wherein the cushion and the bracket are at opposite sides of the base.

8. A support mechanism, comprising:
a bracket; and
a rotary unit comprising a base and at least one adjustment subassembly elastically supporting the bracket rotatably connected to the base;
wherein the adjustment subassembly comprises an elastic member and a resisting member comprising a spherical ball, and a tube defining a cavity, the elastic member and the ball are received and restricted in the cavity of the tube, the elastic member urges the ball to partially protrude out of the tube; the base defines a plurality of receiving holes; the at least one adjustment subassembly comprises a number of adjustment assemblies equal to a number of the receiving holes; the base is spaced from the bracket, and a gap is formed between the base and the bracket; the tube of each adjustment subassembly is received in a respective receiving hole, the ball of each adjustment subassembly extends into the gap, and resists the bracket to elastically support the bracket, the bracket is rotatable relative to the base.

9. The support mechanism of claim 8 further comprising a connecting member to connect the base to the bracket.

10. The support mechanism of claim 9, wherein the connecting member comprises a threaded shaft, a flange, and a step between the threaded shaft and the flange; the base defines a mounting hole; the bracket defines a connecting hole; and the threaded shaft passes through the mounting hole of the base, and engages in the connecting hole of the bracket to connect the base to the bracket.

11. The support mechanism of claim 8, wherein the elastic member is a compression spring to urge the ball to resist the bracket.

12. The support mechanism of claim 8, wherein the receiving holes of the base are threaded and engaged with threads formed on the tubes.

13. The support mechanism of claim 8, wherein the bracket comprises a connecting portion and two supporting legs connected to an end of the connecting portion; the base and the supporting legs cooperatively support the support mechanism.

* * * * *